Aug. 26, 1958 H. F. BESELER 2,849,125
TREE-HANDLING DEVICE
Filed Nov. 28, 1949 6 Sheets-Sheet 1
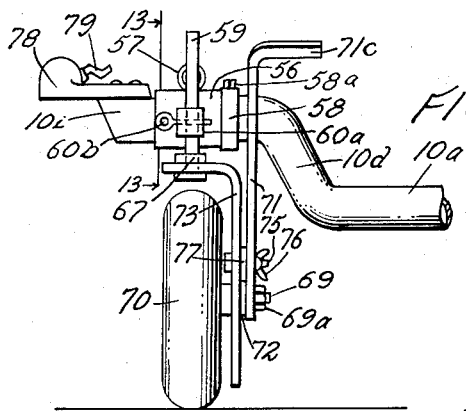
FIG. 12.
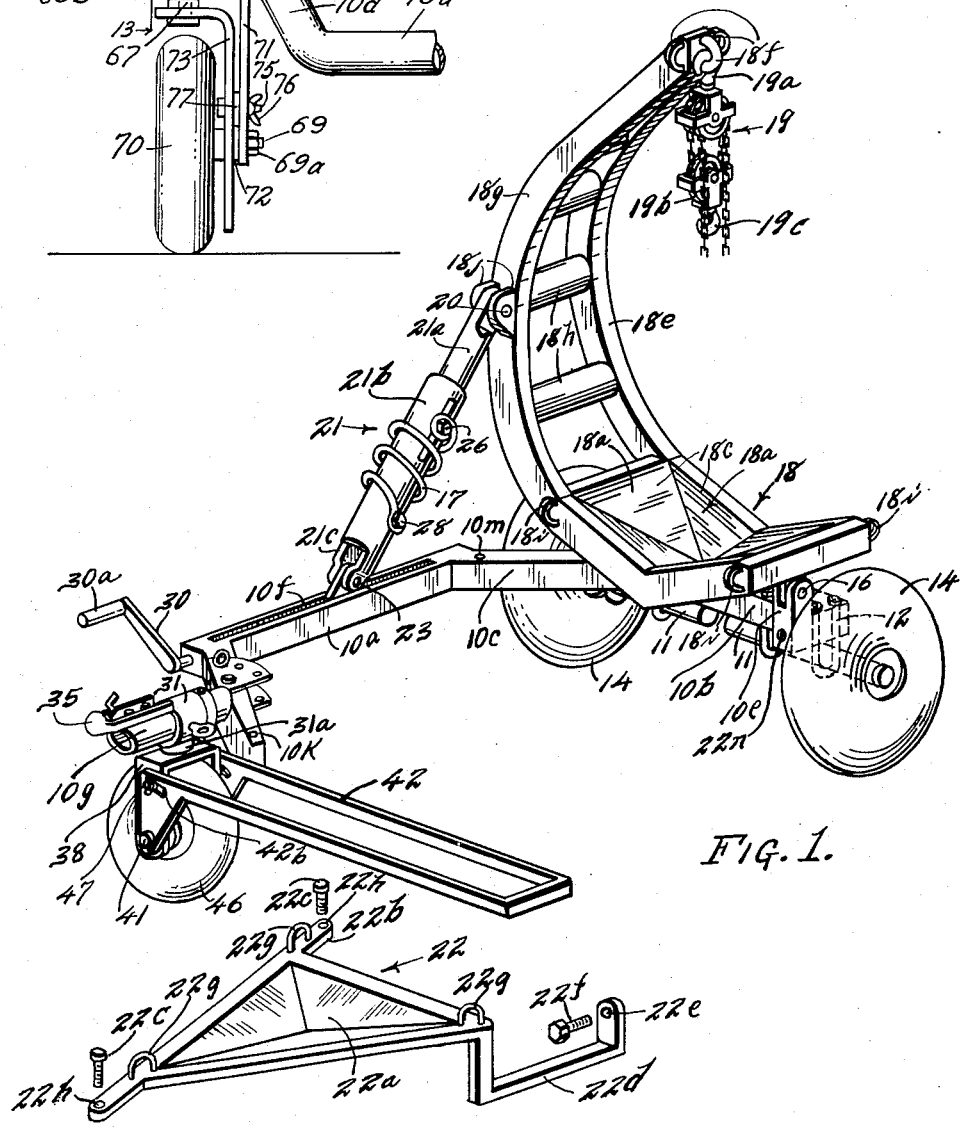
FIG. 1.
FIG. 18.
INVENTOR.
HERMAN F. BESELER
BY Chas. C. Reyf
ATTORNEY

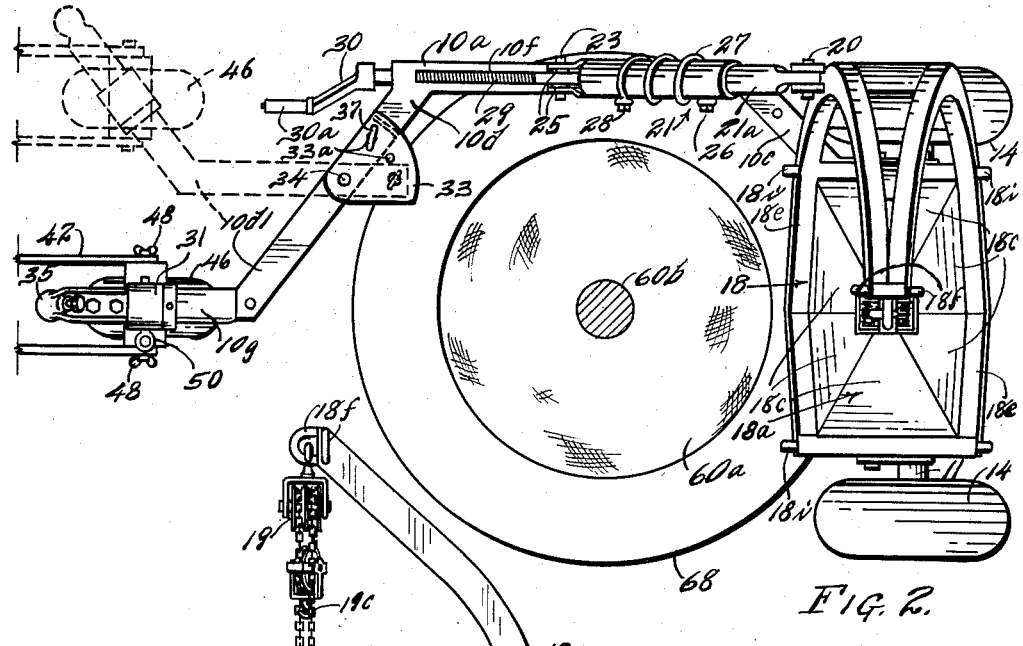
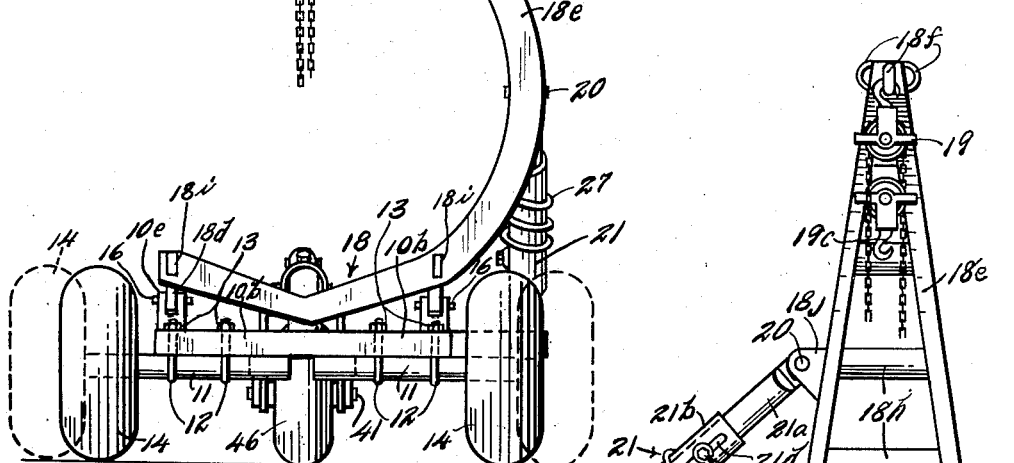
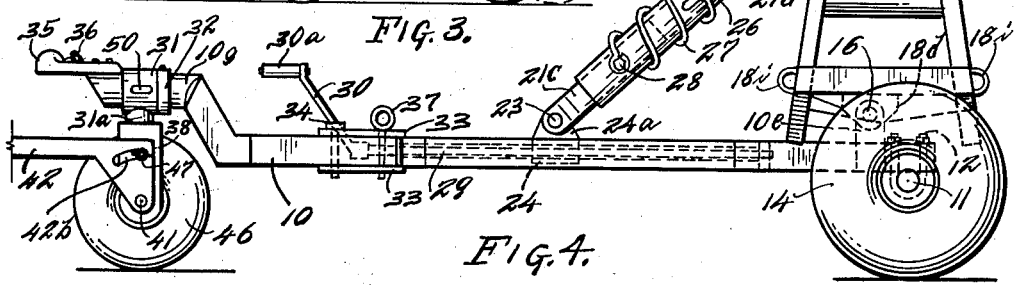

Aug. 26, 1958 H. F. BESELER 2,849,125
TREE-HANDLING DEVICE
Filed Nov. 28, 1949 6 Sheets-Sheet 3

INVENTOR.
HERMAN F. BESELER
BY Chas. C. Reif
ATTORNEY.

Aug. 26, 1958  H. F. BESELER  2,849,125
TREE-HANDLING DEVICE
Filed Nov. 28, 1949  6 Sheets-Sheet 4
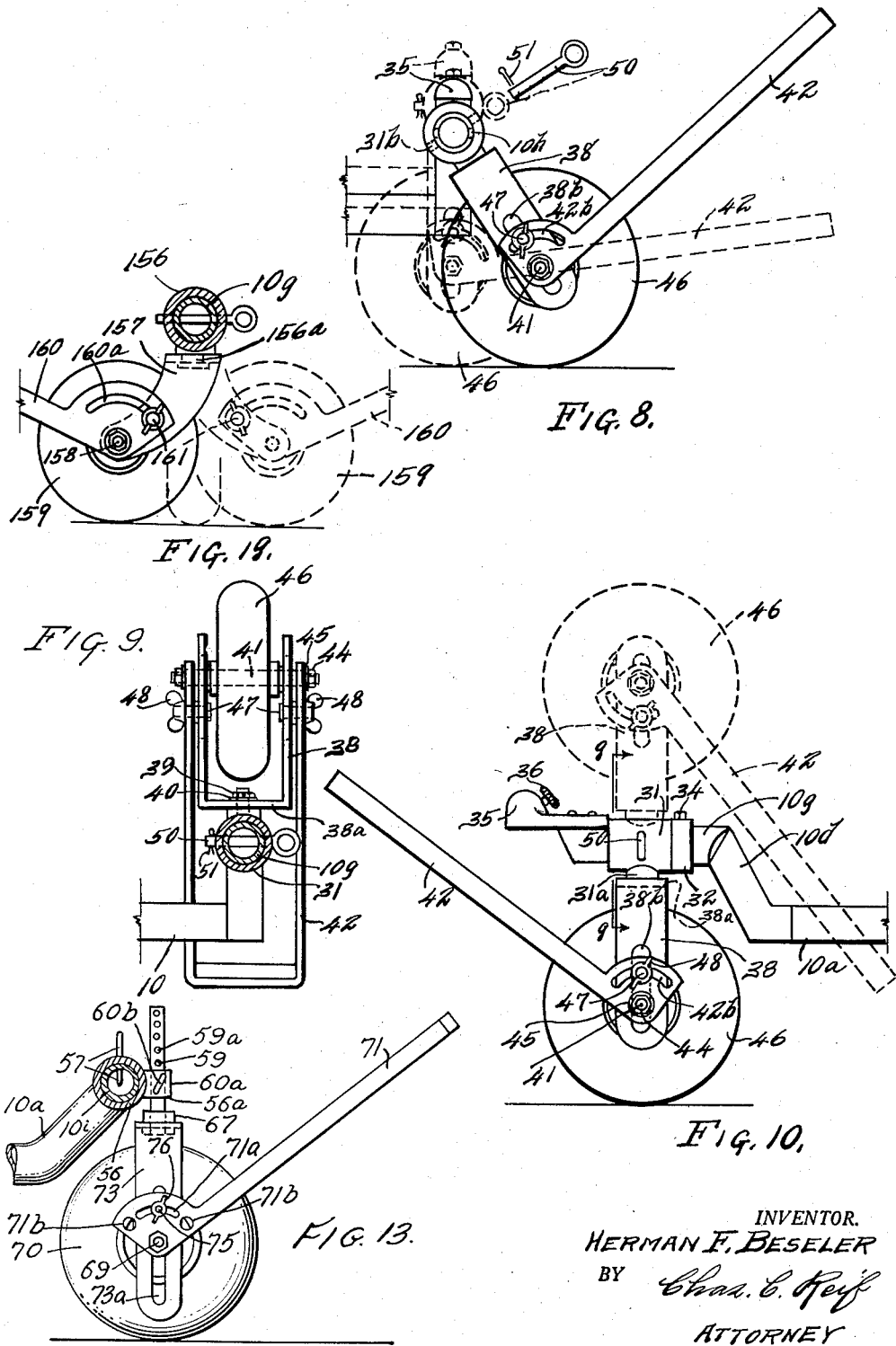
INVENTOR.
HERMAN F. BESELER
BY Chas. C. Reif
ATTORNEY Aug. 26, 1958
H. F. BESELER
2,849,125
TREE-HANDLING DEVICE
Filed Nov. 28, 1949
6 Sheets-Sheet 5
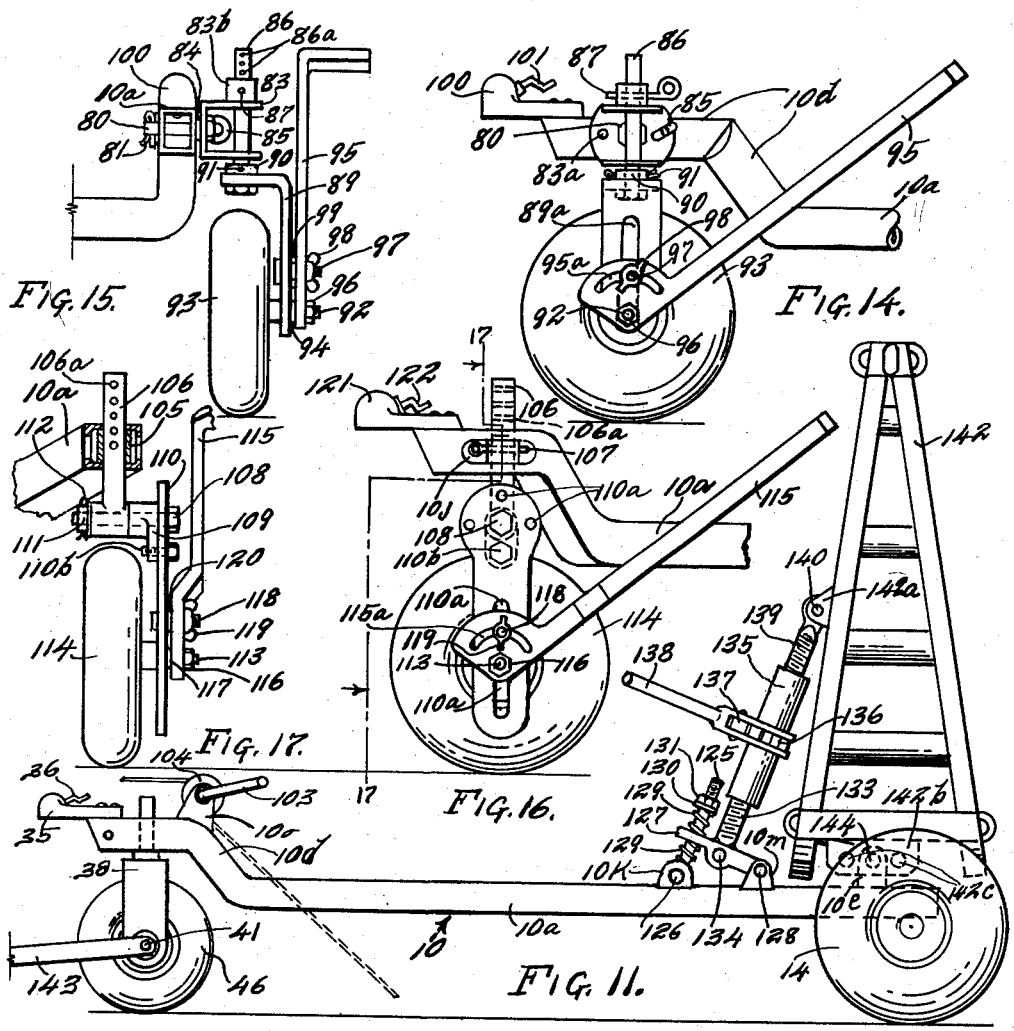
INVENTOR
HERMAN F. BESELER
BY Chas. E. Reif.
ATTORNEY.

Aug. 26, 1958 H. F. BESELER 2,849,125
TREE-HANDLING DEVICE
Filed Nov. 28, 1949 6 Sheets-Sheet 6

INVENTOR
HERMAN F. BESELER
By Chas. C. Reif
ATTORNEY

United States Patent Office 2,849,125
Patented Aug. 26, 1958

2,849,125

TREE-HANDLING DEVICE

Herman F. Beseler, Minneapolis, Minn.

Application November 28, 1949, Serial No. 129,821

9 Claims. (Cl. 214—3)

This invention relates to a tree-handling device, such as is used for lifting and conveying trees to be planted. It is now a business of rather large proportions in which trees of various sizes, usually ornamental trees, are lifted from their growing position and transported to another location where they are again planted. This work is often done by landscape contractors or nurserymen. Although heavy trailers and also trucks with derricks or similar super-structures have been used for moving trees, such equipment gives rise to serious difficulties.

It is an object of this invention to provide a very simple and efficient device by means of which a tree can be lifted from its original position, transported to its new location and then lowered into a hole in which it is planted.

It is another object of the invention to provide a device for handling a tree comprising a frame, a pair of wheels at the rear of said frame for supporting the same, a cradle pivoted at the rear of said frame to swing about an axis extending transversely of said frame, said cradle including an upstanding post at one side thereof forming a boom, a hoist attached at the top of said boom and depending therefrom, together with means for swinging said cradle and post whereby a tree can be lifted at the rear of said frame and said cradle then swung forwardly to deposit the root portion of said tree in said cradle.

It is also an object of the invention to provide such a device as set forth in the preceding paragraph in which said frame has a support at its front end and has an opening intermediate its ends which is preferably open at one side of said frame whereby said tree can be lifted and said cradle swung forwardly so that said tree can be lowered through said opening in said frame and into a suitable planting hole, and a tree may be lifted and loaded in the desired position.

It is another object of this invention to provide a tree-moving and handling device which can be used as a trailer or as a separate self-propelled vehicle and very quickly changed from one to the other even when loaded, such device comprising a swinging cradle and boom by means of which the load can be balanced over the rear wheels when the device is used as a trailer, thus enabling the loaded unit to be pulled by a comparatively light tractor or truck. By thus balancing the load, the tree rides much more easily.

It is still further an object of the invention to provide a tree-handling device comprising a frame having supporting wheels at its rear end, a cradle swingingly mounted at the rear end of said frame to swing about an axis extending transversely of said frame, means for swinging said cradle, said cradle having a post upstanding at one side thereof forming a boom, a hoist secured to the top of said boom, a hitch at the front end of said frame adapted to be connected to a traction means, said frame having a portion at its front end constituting a pivot with its axis extending longitudinally of said frame, a member swingable about said pivot and having a portion extending from said pivot and forming a second pivot, a member preferably in the form of a fork swingable about said second pivot, an axle carried in said fork, a wheel mounted on said axle, and a guiding tongue having a portion swingable about said axle.

It is another object of the invention to provide such a device as set forth in the preceding paragraph in which said axle is movable in slots in said member, means for securing said axle in fixed position, said guiding tongue having a slot therein, and means extending through said last mentioned slot for holding said tongue in different positions about said axle.

These and other objects and advantages of the invention will be fully set forth in the following description made in connection with the accompanying drawings in which like reference characters refer to similar parts throughout the several views and in which:

Fig. 1 is a perspective view of the device of this invention;

Fig. 2 is a top plan view thereof;

Fig. 3 is a rear view thereof;

Fig. 4 is a view in side elevation as seen from the bottom of Fig. 2;

Fig. 8 is a partial view in side elevation showing a front wheel and associated parts, some of the parts being shown in different positions in dotted lines;

Fig. 9 is a vertical section taken on line 9—9 of Fig. 10, as indicated by the arrows;

Fig. 10 is a partial view in side elevation of the front end of said device, some parts being shown in different positions in dotted lines;

Fig. 11 is a view similar to Fig. 4 showing a modification;

Fig. 12 is a view similar to Fig. 10 showing a modification;

Fig. 13 is a vertical section taken substantially on line 13—13 of Fig. 12, as indicated by the arrows;

Fig. 14 is a view similar to Fig. 12 showing a further modification;

Fig. 15 is a view in side elevation as seen from the left of Fig. 14;

Fig. 16 is a view similar to Fig. 14 showing a still further modification;

Fig. 17 is a vertical section taken on line 17—17 of Fig. 16, as indicated by the arrows.

Fig. 18 is a perspective view of an auxiliary cradle used;

Fig. 19 is a vertical sectional view taken substantially on line 9—9 of Fig. 10 but showing a modified structure;

Figure 5:
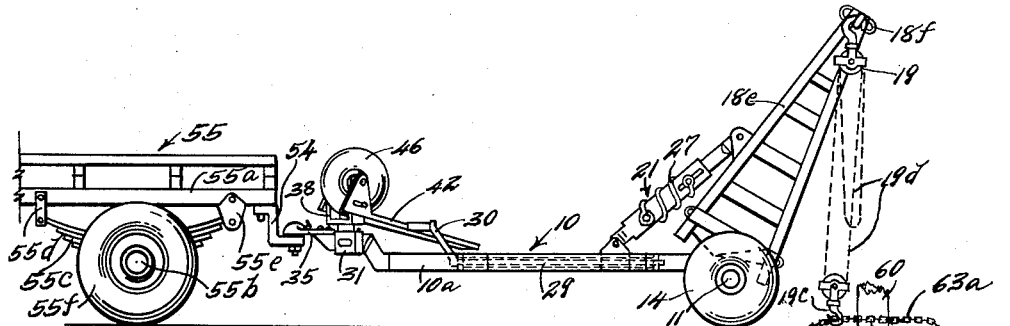
Fig. 5 is a view in side elevation showing the device in connection with a portion of a tree and showing a traction member for pulling said device.

Referring to the drawings, particularly Figs. 1 to 4, a device is shown comprising a frame 10. This frame has a side member 10a extending longitudinally thereof and a rear member 10b extending transversely thereof. Members 10a and 10b are connected by a member 10c extending at an angle to each of said members. Member 10a also has a front portion 10d extending at an angle thereto, said member extending at an angle of approximately 135 degrees with member 10a. A pair of axles 11 are disposed beneath member 10b extending outwardly at either side thereof and said axles are secured to member 10b by U bolts 12 having their bight portions embracing axles 11, said bolts extending through member 10b and being provided with nuts 13 at the top of said member. Members 11 are shown as cylindrical in form and are provided at their ends with wheels 14 shown as equipped with pneumatic tires. It will be seen that by loosening nuts 13, axles 11 can be adjusted toward or away from each other to vary the position of wheels 14, as indicated by the dotted lines in Fig. 3. Member 10b has spaced lugs 10e extending upwardly therefrom at either side thereof and adjacent the ends thereof through which extend respectively pivot pins 16. A cradle 18 is provided having a bottom portion 18a. Cradle 18a constitutes a receptacle and as illustrated the sides 18c thereof slope toward the center thereof, which center is substantially the longitudinal center of frame 10 and midway between wheels 14. Bottom 18a has triangular surfaces 18c which slope toward the central portion of bottom 18a, as shown in Fig. 1. Cradle 18 is provided at the underside thereo with spaced depending lugs 18d which are disposed between the spaced lugs 10e respectively and are apertured to receive the pivot pin 16. Cradle 18 is thus provided to frame 10 and member 10b and arranged to swing about an axis extending transversely of frame 10 and in a general plane extending longitudinally of said frame. Cradle 18 has an arm or post 18e extending upwardly from one side thereof, which is the side at which member 10a is disposed, and while said post could be variously formed, in the embodiment of the invention illustrated it is shown as of curved form with its concave side directed inwardly. Post 18e forms a boom. The top of post 18e is disposed substantially over the center of bottom 18a. Said post at its top has secured therein a plurality of loops or apertured lugs 18f, shown as in planes at right angles to each other, one of which extends transversely of frame 10. A chain hoist 19 is provided having a hook 19a engaging the lug 18f which extends inwardly or transversely of frame 10, which hoist will be of any well known and standard construction. Such hoists are now in common use and well known in the art and further description thereof will be unnecessary except to state that the same has a pulley or sprocket 19b at its bottom from which depends a hook 19c. A loop of the chain 19d is pulled upon manually to operate said hoist in a manner that is well known in the art. Post 18e is shown as having spaced arms 18g extending from the sides of bottom 18a and converging into contact at the top of said post. Spaced transverse strengthening members 18h extend between the arms 18g. Bottom 18 has at either side thereof extending forwardly and rearwardly therefrom spaced loops or apertured lugs 18i.

Extending from the front side of post 18e some distance above bottom 18a are spaced lugs 18j through which extends a pivot pin 20. A link 21 has a member 21a shown as of cylindrical form and having a flattened end, the same having said end disposed between lugs 18j, said end being apertured to receive pivot pin 20. Member 21a extends into a cylindrical sleeve 21b from the other end of which extends a bifurcated member 21c, said member having spaced arms at its end through which extends a pivot pin 23 also extending through a lug 24a upstanding from a member 24. Washers 25 are shown disposed at either side of lug 24a. Sleeve 21b is provided with a longitudinally extending slot 21d at one side through which passes a headed screw 26. A tensile coiled spring 27 has one end secured about screw 26, said spring extending about sleeve 21b and having its other end secured to a screw 28 secured in sleeve 21b. From the described srtucture it will be seen that member 21a can move somewhat longitudinally of sleeve 21b against the tension or compression of spring 27. Member 24 is arranged to be disposed in a slot 10f extending longitudinally in member 10a, said member 24 being tapped to form a nut through which extends a screw 29 journaled in member 10a and projecting at the forward end thereof where it has secured thereto a crank 30 having a handle portion 30a. From the described structure it will be seen that by rotation of crank 30 and screw 29, member 24 will be moved which will pull or push upon link 21 and swing the post 18e and cradle 18 about the pivots 16. Portion 10d adjacent portion 10a has plates 33 of general rectangular shape secured thereto at its upper and lower sides in any suitable manner, as by welding. A part 10d1 of portion 10d is disposed between plates 33 and pivoted thereto by a pivot bolt or pin 34. Plates 33 are provided with a plurality of holes 33a spaced on an arc concentric with the axis of pin 34. A headed pin 37 can be inserted in any pair of vertically alined holes 33a and will pass through a hole in part 10d1 so that said part can be held in different positions, two of which are indicated in full and dotted lines respectively in Fig. 2.

The member 10d at the front of the frame has projecting forwardly therefrom a portion 10g of cylindrical form forming a pivot or journal which is embraced by a member 31 which is swingable about portion 10g. A collar 32 is disposed on member 10g at the rear thereof and adapted to be held in place by a set screw 34. At the forward side of member 31 is a hitch member 35 which has a top portion extending forwardly, said top portion having an enlargement at its front end with a recess therein into which extends a set screw 36. Member 31 has a portion 31a extending radially of portion 10g which has a reduced cylindrical portion extending through the top 38a of a fork or U-shaped member 38 which is secured in place by a nut 39 threaded on said reduced portion. A washer 40 underlies nut 39 and engages member 38. Membor or fork 38 is thus rotatable about the axis of said reduced portion of portion 31a. The sides of fork 38 are provided with slots 38b extending longitudinally thereof and an axle member 41 extends through said slots and through the sides of a guiding tongue 42 which is also shown as of U-shape. Axle 41 is threaded at its ends and equipped with nuts 44 beneath which are disposed washers 45. A wheel 46 is journaled on axle 41 between the sides of fork 38, which wheel is shown as being equipped with a pneumatic tire. The sides of tongue 42 adjacent their free ends are equipped with sector-shaped portions through which extend arcuate slots 42b, the same being concentric with axle 41. Headed bolts 47 extend through slots 38b and through slots 42b respectively, said bolts having their heads disposed at the inner sides of fork 38. The outer ends of bolts 47 are equipped with wing nuts 48. With the described structure it will be seen that axle 41 can be disposed at different points along the sides of fork 38 and that tongue 42 can be held in different positions about axle 41. As shown in Figs. 1 and 8, portion 10g is of hollow or tubular form and said portion as well as the part of member 31 embracing the same are provided with a plurality of circumferentially spaced holes 10h and 31h respectively. A pin 50 is adapted to pass through holes 10h and 31h and said holes are in alignment to hold member 31 in different positions about portion 10g. Member 50 is provided with an eyelet at one end to form a handle and will be held in place by a cotter pin 51 extending therethrough adjacent its end.

The hitch member 35 is adapted to be connected to a hitch member 54 secured to the body 55a of a truck 55 having an axle 55b supported by springs 55c in turn secured to body 55a by lugs 55d and 55e. Axle 55b is equipped with wheels 55f shown as equipped with pneumatic tires. The hitch members 54 and 35 may be of any standard and well known construction.

Figure 6:
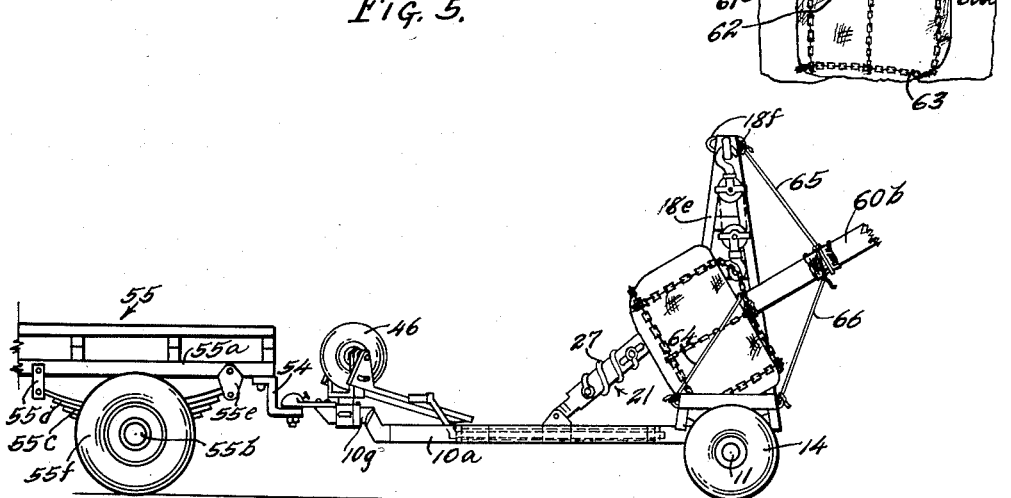
Fig. 6 is a view in side elevation similar to Fig. 5 but showing the parts in different positions.

In operation the frame 10 may be connected to the truck 55, as shown in Figs. 5 and 6, by the hitch member 35, and when so connected the wheel 46 may be in contact with the ground, as shown in Figs. 3 and 4, or it may be disposed, as shown in Figs. 5 and 6. When a tree 60 is to be moved, a hole or trench 61 is usually dug about the root portion 60a of said tree and said root portion and the dirt thereon wrapped and tied with a covering 62 which is usually of burlap. A sling 63 is then placed about the wrapped root portion and tightened thereabout by chains 63a at the top of said sling. The frame 10 will now be backed by the truck 55 to adjacent the hole 61, as shown in Fig. 5. The hook 19c of the hoist 19 will be engaged with the chain 63a and the hoist 19 will be operated to lift the tree 60 from the hole 61 until the wrapped root portion 60a is disposed above the bottom of cradle 18. The cradle 18 will be swung to the position shown in Fig. 5 by rotation of crank 30 before the hoist is engaged with the chain 63a. After the tree is lifted, as stated, the cradle will again be swung forwardly by rotating crank 30 and the root portion 60a will be brought over the bottom 18a. The root portion 60a will then be lowered onto the bottom 18a in the position shown in Fig. 6. Some tension is usually maintained in the chain of the hoist 19d to help steady the tree while being transported. The wrapped root portion 60a is secured to the cradle and to the lugs 18i by ropes 64 and the trunk portion 60b of the tree will be secured to the lugs 18f by ropes 65. The trunk portion 60b can also be secured by ropes 66 to the rear lugs 18i. The tree can now be taken to the new location where it is to be planted by the truck 55. In transit the wheel 46 and attached parts are preferably swung and disposed in the position shown in Figs. 5 and 6. It will be seen that fork 38 with wheel 46 can be rotated about the axis of portion 10g, as indicated in dotted lines in Fig. 10, so that the wheel is easily brought to the position shown in Figs. 5 and 6. The guiding tongue 42 is preferably disposed so that it will extend, as shown in Figs. 5 and 6. It will be noted that in the described operation the truck 55 acts as a counterbalance or weight to offset the weight of the tree since the frame 10 could pivot about the axis of wheels 14. Boom 18e is preferably positioned by means of crank 30 so that the tree mover together with tree 60 is balanced over rear wheels 14 when traveling.

While the tree is being transported it will be seen that the post 18e which forms a boom can swing slightly about its pivot point against the tension of a compression spring 27. Portion 21a of link 21 can move somewhat against the compression of said spring. This is important as it prevents whipping of the tree top when the frame 10 moves over bumpy roads. Whipping may cause the earth to loosen from the roots. The post or boom 18e tends to remain in a vertical position due to the weight of the tree while the front end of frame 10 moves up and down somewhat due to unevenness of the road. If desired, bolt 26 can be tightened against sleeve 21 to make the link 21 rigid. When the tree is brought to the new location the frame 10 is preferably backed by the truck 55 to a point adjacent the planting hole 68, as shown in Fig. 6. Usually the tree trunk and branches will point to the rear, as shown in Fig. 6. However if the planting hole is close to a building or to other trees or other obstruction, the tree can be raised and swung approximately 180 degrees about a vertical axis from the position shown in Fig. 6 to facilitate getting the device into the desired planting position. To lower the tree into the hole 68 the post 18e will be swung rearwardly, and the tree then lowered with the hoist 19, as shown in Fig. 5. While suspended the tree can be rotated to bring the best side thereof into the desired position. When the root portion 60a rests on the bottom of the hole 68, the hook 19c can be released and the sling 63 will then be removed. Dirt can now be packed about the root portion 60a in the usual manner. By placing the hook 19c into engagement with different portions of chain 63a, the tree can also be rotated.

Figure 7:
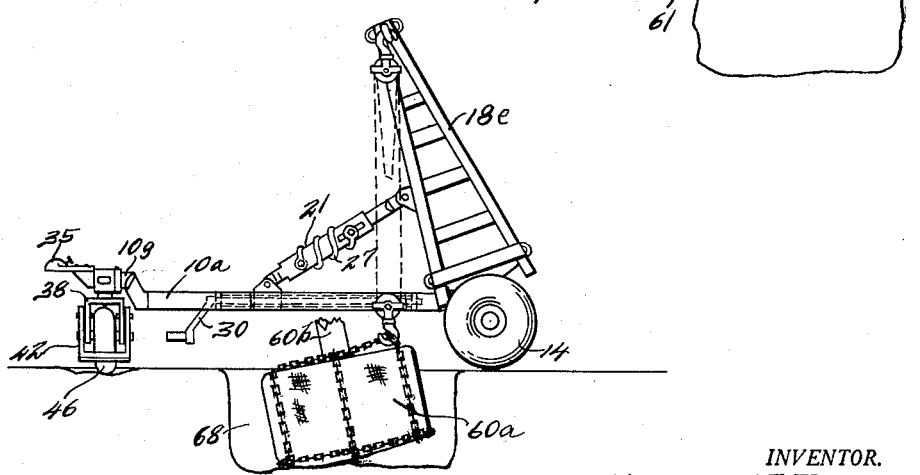
Fig. 7 is a view in side elevation similar to Fig. 6 but showing the parts in other positions with the traction means omitted.
Figure 22:
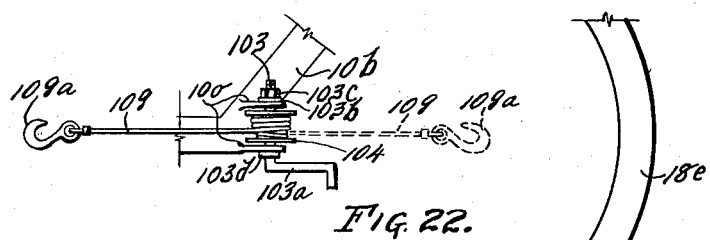
Fig. 22 is a partial plan view illustrating a winch used.

When the tree is to be planted on a lawn or other location where it is not desirable to go with the truck, the truck 55 will be disconnected, the wheel 46 having been swung down to supporting position. By taking hold of guiding tongue 42 the frame can be easily pushed and guided as desired to come into proper relation with the planting hole 68, as can be seen from Fig. 7. The wheels 46 and 14 will not usually objectionably mar the lawn. It is quite easy to steer the frame by manipulating the tongue 42. It is often desired to adjust the distance between wheels 14 to avoid obstacles on the ground or to get more supporting distance when operating on a hillside. The steering tongue can also be used as a lever fulcruming on wheel 46 to raise the front end of the frame to the proper height to engage or disengage the truck hitch 54. By rotating tongue 42 about the axle 41 and securing said tongue in position with wing nuts 48, the desired leverage can be secured to raise the front of frame 10. The axle 41 can also be adjusted in the slots 38b to vary the distance of wheel 46 from the axis of portion 10g to provide for variable heights of the hitch 54 above the ground. A tree can also be loaded upon the tree mover when in position as shown in Fig. 7. It will be seen that one side of the frame 10 is open and that there is an opening between the front and rear ends thereof, as clearly indicated in Fig. 2, so that the tree can be lowered into the hole 68 without any interference from the frame 10. Auxiliary cradle 22 can be used to support a tree in addition to the one supported by cradle 18, and can often be used when one tree is carried to better balance the load, or change the balancing point. Portion 10d1 can be swung about pivot bolt 34 to position wheel 46 in different positions transversely of frame 10; and said portion will be held in said positions respectively by pin 37. Wheel 46 can thus be located to avoid a row of plants, shrubs or trees over which the frame had to be moved. Wheel 46 can also be swung to one side on sloping ground to keep frame 10 in a more level position or to change the center of gravity of the load when desirable. At some times portion 10d1 could be detached. The rear portion of frame 10 could be mounted on a platform truck and used just as a derrick.

In Figs. 12 and 13 is shown a modification of the structure shown in Figs. 8 to 10. The member 10a is provided with a cylindrical portion 10i about which is rotatable a member 56, the same having a laterally projecting lug 56a. The portion 10i will be provided with a plurality of radially extending holes through any one of which may extend the end of a pin 57 having a circular head and extending vertically through a hole in the top of member 56. A collar 58 surrounds portion 10a and abuts member 56 to hold the same in position, said collar being secured to portion 10a by the set screw 58a. The lug 56a is apertured to have passed therethrough a bar 59 having extending therethrough a plurality of spaced holes 59a. Lug 56a is apertured to have a pin 60b extend therethrough and through any one of the holes 59a. Pin 60b is shown as having a circular end or handle. Bar 59 has a head at its lower end against which is seated one arm of a member 73, which arm is apertured to receive bar 59 and which is held in place by a collar 67. Member 73 has a vertically extending arm and this can be swung about the axis of bar 59. Said vertical arm of member 73 has an elongated slot 73a extending centrally therethrough and an axle 69 extends through this slot and carries a wheel 70 shown as equipped with a pneumatic tire. Axle 69 also extends through one end portion of a handle or tongue 71, members 73 and 71 being separated by a washer 72. Member 71 is held in place by the nut 69a threaded on the end of axle 69. Tongue 71 has a sector-shaped end through which extends an arcuate slot 71a, which slot is concentric with the axis of axle 69. A headed bolt 75 extends through slot 73a and through the slot 71a and is threaded at its end to receive a wing nut 76. A washer 77 surrounds bolt 75 between members 73 and 71. Member 71 also has a pair of holes 71b therethrough, the centers of which are disposed in the extended center line of slot 71a. If desired, bolt 75 could pass through one of these holes. Tongue 71 is provided with an end portion or handle 71c bent at right angles to the main portion of tongue 71. A hitch 78 is secured to the end of member 10a, the same having a clamping screw 79 therein shown as having a crank handle.

With the described construction it will be seen that axle 69 can be held in different vertical locations in slot 73a. Tongue 71 can also be adjusted to different angular positions about axle 69. Member 59 can be adjusted to lower member 73 and thus lower the wheel 70 so that member 10a will be supported at a greater distance above the ground. The bar 59 and all parts carried thereby, including wheel 70, can be swung about the center of portion 10i so that the wheel 70 can be brought to the position illustrated in dotted lines in Fig. 10. By adjusting tongue 71 said tongue can sometimes be used as a lever to raise the portion 10i to bring the hitch 78 into alignment with the hitch on the traction vehicle.

In Fig. 11 a winch is shown mounted on frame portion 10d comprising brackets 10o secured to frame 10. A shaft 103 having a crank handle 103a at one end is journaled in brackets 10o to which is secured a drum 104 on which is wound a cable 109, shown as connected to a hook 109a. A washer 103b is positioned on shaft 103 at the outer side of one bracket 10o and a nut 103c threaded on shaft 103 engages washer 103b. A collar 103d in shaft 103 engages the outer side of the other bracket 10o. Cable 109 can be attached to chain 63a and then wound on drum 104 to rotate the sling 62 and the tree to position it as desired or to break loose some of the roots. Cable 109 could also be attached to a tree or other stationary object in front of or at the rear of frame 10 and said cable then wound on drum 104 to pull the frame and load a comparatively short distance into a desired location. The winch is often convenient to move the frame a short distance up a hill.

In Fig. 18 an auxiliary cradle 22 is shown having a central portion 22a having a plurality of parts sloping downwardly to a common point. Apertured lugs 22b and 22h project from two sides of cradle 22 and are adapted to receive the bolts 22c adapted to be secured in tapped holes 10k and 10m respectively in frame 10. An arm 22d of cradle 22 is adapted to extend under cradle 18a and has an aperture 22e adapted to receive a bolt 22f receivable in a tapped hole 10n in one of the lugs 10e. Staples 22g are secured to cradle 22 for the attachment of ropes to hold a tree in position.

In Figs. 14 and 15 another structure is shown in which portion 10d is shown as having a box section which will be apertured to have pass therethrough the headed bolt 80 apertured at one end to receive the cotter pin 81. A channel-shaped member 83 has its flanges directed away from member 10d and its web separated from member 10a by a washer 84 through which bolt 80 passes. Member 83 is oscillatable about the axis of bolt 80 and is provided with a pair of holes 83a at each side of said bolt through one of which may pass a pin 85 which extends into a hole in member 10d. Member 83 is thus held in stationary position. Member 83 has secured to its upper side a collar 83b and a cylindrical bar 86 passes through collar 83b and through the sides of member 83. Bar 86 is provided with a plurality of spaced holes 86a through any one of which may pass a pin 87 also passing through the hole in collar 83b. Pin 87 is shown as having an eyelet-shaped end. The bar 86 is shown as having a hexagon head at its bottom on which rests one arm of a member 89. A collar 90 is secured to bar 86 above member 89, said collar being held in place by a cotter pin 91. Member 89 has a vertical arm having an elongated slot 89a extending therethrough, through which passes an axle 92 the same supporting a wheel 93 shown as equipped with a pneumatic tire. A handle member or tongue 95 is apertured at one end to receive axle 92 and is held in place thereon by the nut 96. A washer 94 surrounds axle 92 between members 89 and 95. Tongue 95 is provided with an arcuate slot 95a concentric with the axis of axle 92 and a headed bolt 97 extends through slots 89a and 95a and has on its threaded end a wing nut 98 holding tongue 95 in place. A washer 99 surrounds bolt 97 between members 89 and 95. A hitch 100 is secured to the end of member 10d and is provided with a clamping screw 101 shown as having a crank handle.

With the construction shown in Figs. 14 and 15 it will be seen that axle 92 can be adjusted vertically on member 89. Tongue 95 can be adjusted about axle 92 and member 89 with the parts carried thereby can be swung with bar 86 and member 83 about the axis of member or bolt 80 so that the wheel 93 can be swung to the position shown in dotted lines in Fig. 10. The vertical position of the wheel 93 can be changed by adjustment of the pin 87. Tongue 95 can be adjusted about the axis of bolt 92, and as previously described, the tongue 95 can be used as a lever to lift the hitch 100 to bring it into alignment with the registered hitch. If pin 85 is placed in the other hole 83a from the one which it occupies in the drawing, members 89 and 86 will be disposed upwardly in vertical position. The structure shown in Figs. 14 and 15 is therefore quite versatile in securing the desired adjustments.

In Figs. 16 and 17 a further modification of the structure shown in Figs. 8 and 10 is illustrated. In this structure member 10a is shown as having a box section through which extends a transverse opening or slot 10j. A block 105 is disposed in member 10a and is bored to receive a cylindrical bar 106 provided with a plurality of spaced holes 106a. Block 105 is bored to receive a headed pin 107 which may pass through any one of the holes 106a. Bar 106 has a hub at its lower end bored to receive a headed bolt 108 which extends through a hub on a member 109 which is bolted to a vertical bar-like member 110. Bar 110 has an upper semi-cylindrical portion having extended therethrough a plurality of circumferentially spaced holes 110a. A bolt 110b extends through one of the holes 110a and is threaded into member 109. Bolt 108 has thereon a collar 111 held in place by a cotter pin 112. Member 110 has extending therethrough an elongated centrally located slot 110a through which passes an axle 113 which carries a wheel 114. A handle member or tongue 115 is provided and is apertured adjacent one end to have the axle 113 pass therethrough, the same being engaged by a nut 116 on the threaded end of axle 113. A washer 117 surrounds axle 113 between members 110 and 115. Member 115 has an arcuate slot 115a extending therethrough which is concentric with the axis of axle 113. A headed bolt 118 passes through slot 110a, then through slot 115a, the same being provided with a wing nut 119 engaging tongue 115 to hold the same in place. A thin washer 120 is disposed on bolt 118 between members 110 and 115. A hitch 121 is secured to the end of member 10a and is provided with a clamping screw 122 shown as having a crank-shaped end.

With the construction shown in Figs. 16 and 17, the structure carried on bar 106, including wheel 114, can be held in different vertical positions by placing pin 107 in different holes 106a. Said structure, including wheel 114, can swing about the axis of bar 106 just as wheel 93 can swing about the axis of bar 86. The vertical position of wheel 114 can also be varied by adjusting axle 113 in the slot 110a. Member or bar 110 can be moved to different positions about the axis of bolt 108 by disposing bolt 110b in different holes 110a. A very versatile structure is thus obtained.

In Fig. 11 the frame 10 with member 38, wheels 46 and 14 with their axle constructions are shown, as in Fig. 4. The side 10a of the frame has projecting upwardly therefrom adjacent the rear end thereof spaced pairs of lugs 10k and 10m. A bolt 125 having an eyelet end is mounted on a pivot 126 passing through the lugs 10k. Bolt 125 passes through an opening adjacent one end of a lever 127 the other end of which is apertured and pivoted between lugs 10m on a pivot 128. Compression springs 129 are disposed on bolt 125 at each side of lever 127. The spring below said lever engages the head of bolt 125 and the underside of lever 127 while the spring above lever 127 engages the top of said lever and a washer 130 on bolt 125 which is in turn engaged by a nut 131 threaded on said bolt. A screw 133 is provided, the same having an eyelet head pivoted on a pin 134 extending through the intermediate part of lever 127. Screw 133 is threaded into a sleeve 135. Sleeve 135 is provided between its ends with ratchet teeth 136 adapted to be engaged by a pawl 137 carried on a lever 138 pivoted on sleeve 135. Another screw 139 is threaded into the other end of sleeve 135 and has an eyelet end pivoted on a pivot pin 140 secured in a lug 142a extending from the side of a boom 142 which is identical with the boom 18e already described. Boom 142 however has lugs 142b at its bottom having a plurality of holes 142c therein, in any one of which the pivot 144 connecting said lugs with the lugs 10e on frame 10 may be disposed. A tongue 143 is secured to the axle 41 of wheel 46.

The structure comprising sleeve 135 and screws 133 and 139 with the lever 138 and the ratchet structure constitutes what is commonly called a "push and pull jack." By rotating sleeve 135 in one direction the screws 133 and 139 will be extended or moved away from each other while by rotating sleeve 135 in the other direction the screws 133 and 139 will be moved toward each other and the jack thus contracted. When the jack is extended, boom 142 will be swung rearwardly, and when the jack is contracted, said boom will be swung forwardly. The jack thus constitutes another means for moving the boom from that shown in Figs. 2, 3 and 4.

In Fig. 19 a member 156 similar to member 31 is shown as revolubly mounted on portion 10g at the front of the frame. A fork 157 is connected to member 156 by the projection 156a which extends through the top of fork 157 and is enlarged beneath said top. Fork 157 can rotate about the axis of projection 156a. Fork 157 is curved laterally to its lower end in which is secured a headed and nutted axle 158 on which is journaled a wheel 159. A tongue 160 similar to tongues 42 and 95 is pivoted on axle 158 and has a sector-like portion 160a through which extends a slot 160b concentric with the axis of axle 158. A bolt 161 equipped with a wing nut extends through one side of fork 157 and slot 160b. Tongue 160 can thus be held in different positions about axle 158. By swinging fork 157 about the axis of projection 156a, the center of gravity of the truck can be varied when it is located on a hillside. Better support can often be obtained by locating wheel 159 on the low side of the vehicle.

Figure 20:
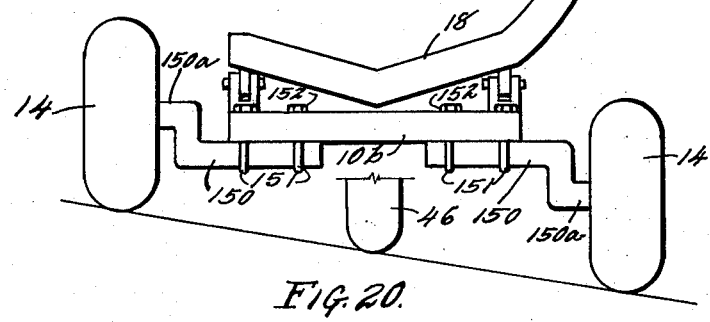
Fig. 20 is a somewhat diagrammatic view showing a modified axle structure.
Figure 21:
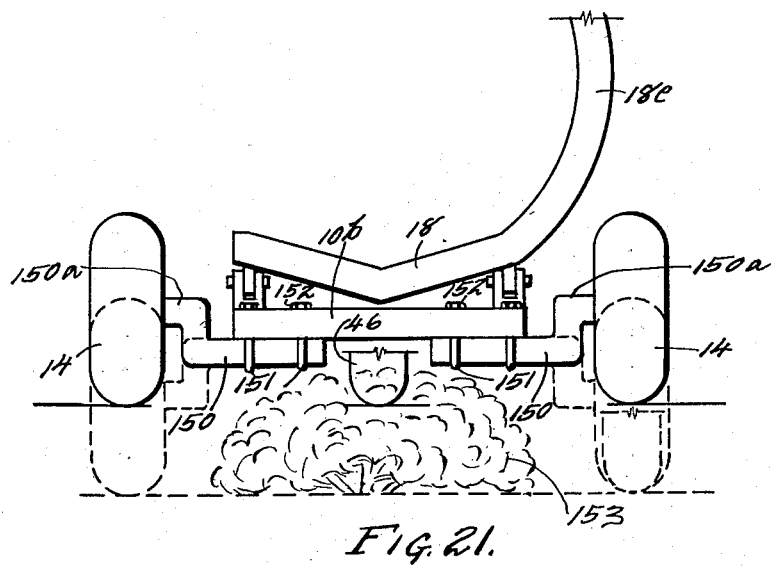
Fig. 21 is a view similar to Fig. 20 showing the parts in different positions.

In Figs. 20 and 21 a modified form of axles 150 is shown. Each axle 150 has a crank or offset portion 150a at its outer end. Said axles are clamped to member 10b of the frame by the U-bolts 151 equipped with nuts 152. As shown in Fig. 20, the axles can be secured with one portion 150a up and one down so that the vehicle can move in a level position on a hillside. Both portions can be up and this will lower frame 10. This will lower the center of gravity of the load which is often desirable in handling the vehicle and load. Both portions 150a can be down, as shown in dotted lines in Fig. 21, and frame 10 is then raised and could pass over a row of trees 153 or nursery stock.

From the above description it will be seen that I have provided a comparatively simple and yet very efficient tree-handling device. The device has been worked out after years of experience in moving and planting trees. With the device the tree can be lifted, transported and positioned for planting in much less time than with trucks and/or apparatus heretofore used. Usually several men are used in the operation and they can put in a tremendous amount of time in lifting and positioning a tree on a truck and then positioning it again for planting. With the present device the tree is held nicely in position while being transported and much less damage is done to the tree and the root portion thereof in transportation than heretofore. The cradle is designed so that the tree ball is supported at more than one point of contact. Thus there is less danger of loosening the earth about the roots, also the tree is held more securely when traveling.

It is obvious that the equipment described is extremely versatile; it can be used as a trailer, or as a separate vehicle, or very quickly changed from one to the other, even when loaded. Due to the swinging or tilting cradle, the load can be balanced over the rear wheels when used as a trailer and consequently permit the loaded unit to be pulled by a comparatively light tractor or truck. By balancing the load it also rides better. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combination of parts disclosed and defined in the appended claims.

What is claimed is:

1. A tree-handling device having in combination, a frame comprising a side member and a transverse member at the rear thereof, said frame having an opening in front of said transverse member, a cradle on said frame having a top surface adapted to support a tree and tree ball with the trunk of said tree inclined to the vertical pivoted adjacent the rear thereof and having an upstanding post at the same side as said side member, the same forming a boom, said cradle being swingable about an axis extending transversely of said frame, a hoist secured to the upper end of said boom and depending therefrom, and means for swinging said cradle whereby an object can be lifted at the rear of said frame by said hoist and swung over said frame by said boom, placed on said cradle and can be lifted from said cradle and lowered by said hoist through said opening.

2. The structure set forth in claim 1, said cradle having a top surface with downwardly and inwardly inclined flat portions and said post extending laterally and upwardly in curved form with its concave side directed inwardly of said frame and with its top disposed substantially over the transverse center of said surface.

3. A tree-handling device having in combination, a frame having a side member and a transversely extending rear member, a cradle having a top surface adapted to support a tree and tree ball with the trunk of said tree inclined to the vertical supported on said frame and being pivoted thereon for swinging movement about a transverse axis, said cradle having an upstanding post at the same side thereof as said side member, said side member having a guideway therein, a member movable in said guideway, a screw journaled in said side member and engaging said member for moving the same in said guideway, a link connecting said member and post, and means for rotating said screw for swinging said cradle.

4. A tree-handling device having in combination, a frame having an axle and a pair of wheels thereon adjacent the rear end thereof on which it is supported, a substantially rigid cradle having a comparatively large top surface adapted to receive a tree ball and disposed above the rear end of said frame, including an upstanding post at one side rigid therewith and forming a boom, a hoist carried by said boom and depending from the upper end thereof directly over said surface, said cradle being pivotally mounted beneath the same relatively to said frame and above said axle for swinging movement forwardly and rearwardly of said frame and being swingable from a position with said post vertical through a substantial angle forwardly and rearwardly, means for swinging said cradle, said frame having a member at one side thereof, means for moving said member longitudinally of said frame, and said first mentioned means comprising a link connecting said member and post for swinging said post and cradle.

5. The structure set forth in claim 4, said link comprising longitudinally movable sections, and a resilient means connecting said sections.

6. A tree-moving device having in combination, a skeleton vehicle frame having a longitudinal beam and a transverse beam and having an open center portion, a boom having a concave side extending transversely inwardly and pivotally mounted on said transverse beam with its pivotal axis parallel to the axis of said latter beam, a hoist secured to the upper end of said boom, a load-supporting cradle at the lower end of said boom and rigid with said boom, said cradle having a top surface adapted to receive and support a tree and tree ball, and means for swinging said boom about its pivotal axis so that a load can be swung from one side of said transverse beam to the other side thereof.

7. A tree-handling device having in combination, a frame comprising a rear transversely extending member and a side member extending forwardly from adjacent one end of said member, said frame being open at its other side, a cradle having a comparatively large top surface disposed adjacent the rear of said frame and swingable about an axis extending transversely of said frame, said surface inclining downwardly toward its central portion, said cradle having an upstanding post at the side thereof adjacent said side member, said post extending upwardly and inwardly, a hoist having a lifting means depending from the top of said post substantially centrally over said surface, and means for swinging said cradle about said axis, said post being resiliently supported against movement about said axis whereby said cradle and post can be swung rearwardly and a tree ball lifted at the rear of said frame, said cradle and post then swung forwardly and said tree ball lowered at the forward end of said cradle through said open frame.

8. A frame having a longitudinally extending member at one side thereof, a wheel equipped axle adjacent the rear of said frame and extending transversely thereof for supporting said frame, a member having a comparatively large top surface adapted to support a tree and tree ball and a boom extending upwardly and inwardly from the side of said cradle adjacent said side of said frame, and a hoist depending from the upper end of said boom over said surface, said member being swingable about a transverse axis beneath the same, said frame being open in the rear of said member, and means for swinging said member.

9. The structure set forth in claim 8, and means for resiliently supporting said member against swinging movement.

References Cited in the file of this patent

UNITED STATES PATENTS

| | | |
|---|---|---|
| 298,218 | Louden | May 6, 1884 |
| 725,465 | Mason | Apr. 14, 1903 |
| 986,390 | Hill | Mar. 7, 1911 |
| 986,399 | Lundin | Mar. 7, 1911 |
| 1,161,878 | O'Leary | Nov. 30, 1915 |
| 1,180,313 | O'Loughlin | Apr. 25, 1916 |
| 1,299,313 | Elrod | Apr. 1, 1919 |
| 1,649,574 | Conway | Nov. 15, 1927 |
| 2,105,353 | Irish | Jan. 11, 1938 |
| 2,159,395 | Mersereau | May 23, 1939 |
| 2,198,690 | Wilmore | Apr. 30, 1940 |
| 2,215,935 | Pyeatt | Sept. 24, 1940 |
| 2,245,853 | Eagleson | June 17, 1941 |
| 2,258,289 | Jeffery | Oct. 7, 1941 |
| 2,332,962 | Barrett | Oct. 26, 1943 |
| 2,360,654 | Day | Oct. 17, 1944 |
| 2,411,821 | Choat | Nov. 26, 1946 |
| 2,492,608 | Wilms | Dec. 27, 1949 |
| 2,524,083 | Ronning | Oct. 3, 1950 |
| 2,550,185 | Busch | Apr. 24, 1951 |
| 2,554,140 | Eakin | May 22, 1951 |